(12) United States Patent
Thangamani

(10) Patent No.: US 9,062,659 B2
(45) Date of Patent: Jun. 23, 2015

(54) NACELLE THERMAL CONDITIONING SYSTEM FOR OFF-SHORE WIND TURBINES

(75) Inventor: Arunvel Thangamani, Chennai (IN)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 641 days.

(21) Appl. No.: 13/309,991

(22) Filed: Dec. 2, 2011

(65) Prior Publication Data

US 2013/0140829 A1  Jun. 6, 2013

(51) Int. Cl.
  *F03D 11/00* (2006.01)
  *H02K 9/02* (2006.01)

(52) U.S. Cl.
  CPC  *F03D 11/00* (2013.01); *H02K 9/02* (2013.01); *F05B 2260/20* (2013.01); *Y02E 10/722* (2013.01); *Y02E 10/726* (2013.01)

(58) Field of Classification Search
  CPC .................................................. F03D 11/00
  USPC .................. 415/116, 175, 177; 416/95, 96 R
  See application file for complete search history.

(56) References Cited

U.S. PATENT DOCUMENTS

| | | | |
|---|---|---|---|
| 3,762,884 A * | 10/1973 | Grisaffe et al. | 428/610 |
| 7,161,260 B2 * | 1/2007 | Kruger-Gotzmann et al. | 290/55 |
| 7,427,814 B2 * | 9/2008 | Bagepalli et al. | 290/55 |
| 2008/0078536 A1 * | 4/2008 | Tolani | 165/134.1 |
| 2010/0061853 A1 * | 3/2010 | Bagepalli | 416/95 |
| 2012/0025541 A1 * | 2/2012 | Hirai et al. | 290/55 |
| 2012/0074711 A1 * | 3/2012 | Sato et al. | 290/55 |

* cited by examiner

*Primary Examiner* — Dwayne J White
*Assistant Examiner* — Justin Seabe
(74) *Attorney, Agent, or Firm* — Ladas & Parry LLP

(57) ABSTRACT

A thermal conditioning system for an off-shore wind turbine is provided. The thermal conditioning system comprises channels for circulating ambient air from an inlet area located in the outside of the wind turbine nacelle to an outlet area located in the outside of the wind turbine preventing that the ambient air enters inside the wind turbine nacelle. The ambient air channels are arranged to cool conductively or convectively the air inside the wind turbine nacelle.

10 Claims, 4 Drawing Sheets

NACELLE THERMAL CONDITIONING SYSTEM FOR OFF-SHORE WIND TURBINES

BACKGROUND OF THE INVENTION

This invention relates generally to a thermal conditioning system for wind turbines and more particularly to a thermal conditioning system for off-shore wind turbines.

Wind turbines are devices that convert mechanical energy to electrical energy. A typical wind turbine includes a nacelle mounted on a tower housing a drive train for transmitting the rotation of a wind rotor to an electric generator through, usually, a gearbox, and other components such as a yaw drive which rotates the wind turbine, several controllers and a brake. The wind rotor comprises a rotor hub supporting a number of blades extending radially therefrom for capturing the kinetic energy of the wind and causing the driving train rotational motion.

Some components of the wind turbine, particularly the gearbox and the generator are coupled to heat exchangers.

Known thermal conditioning systems of on-shore wind turbines combine the use of ambient air to cool the nacelle with the installation of heat exchangers associated to particular wind turbine components.

However in off-shore wind turbines the ambient air intake into the nacelle is not feasible due to its salinity and corrosive nature.

Taking into account the high powers foreseen for off-shore wind turbines, it seems thus necessary the use of high power, big size, and heavy weight heat exchangers. The cost of these heat exchangers may be very high.

Additionally the dimensions foreseen for said heat exchangers may require its installation outside the nacelle.

BRIEF DESCRIPTION OF THE INVENTION

According to the present invention, a thermal conditioning system for an off-shore wind turbine is provided. The thermal conditioning system comprises channels for circulating ambient air from an inlet area located in the outside of the wind turbine nacelle to an outlet area located in the outside of the wind turbine preventing that the ambient air enters inside the wind turbine nacelle. Said ambient air channels are arranged to cool conductively or convectively the air inside the wind turbine nacelle.

In one embodiment, the ambient air channels are arranged on the skin of the nacelle and the thermal conditioning system comprises heat exchanging zones between ambient air channels and channels arranged on the skin of the nacelle for circulating nacelle air from an inlet port located inside the wind turbine nacelle to an outlet port located inside the wind turbine nacelle. The heat exchanging zones are configured so that at least a nacelle air channel is adjacent to at least an ambient air channel for cooling the nacelle air with the ambient air. In a particularly suitable configuration, said heat exchanging zones are configured with one nacelle air channel between two ambient air channels. Said heat exchanging zones can be located in the base and in the lateral sides of the nacelle. Said ambient air inlet and outlet areas and said nacelle air inlet and outlet ports can be provided with fans. It is provided therefore a new design of a nacelle skin for off-shore wind turbines incorporating a thermal conditioning system based on the use of ambient air that reduces the heat exchanging needs to be covered by internal heat exchanging devices.

Said heat exchanging zones can be implemented by means of a metallic structure placed between the outer wall and the inner wall of the nacelle skin, comprising plates for separating said channels and fins for delimiting multiple passages in each channel. A metallic core acting as heat exchanging surface within the nacelle skin is therefore provided.

Advantageously said metallic structure is made up of a corrosion resistant material, particularly stainless steel with nickel chromium coating.

In another embodiment, the ambient air channels are arranged inside the wind turbine nacelle close to its inner periphery. Said ambient air channels can be two serpentine-shaped tubes extending parallel to the lateral sides of the nacelle that may be coupled to at least one heat exchanging device of a wind turbine component preventing that the ambient air is mixed with the nacelle air.

The inlet and outlet areas of said two serpentine-shaped tubes may be located in the roof or in the lateral sides of the nacelle and may be provided with fans. It is provided therefore a thermal conditioning system based on the use of ambient air that reduces the heat exchanging needs to be covered by internal heat exchanging devices that can be installed in known off-shore wind turbines without requiring design modifications.

According to an embodiment of the invention a thermal conditioning system for an off-shore wind turbine comprises channels for circulating ambient air from an inlet area located in the outside of the wind turbine nacelle at the rear side of the roof to an outlet area located in the outside of the wind turbine nacelle at the rear side of the roof preventing that the ambient air enters in fluid communication with the air inside the wind turbine nacelle, said ambient air channels being arranged to cool conductively or convectively the air inside the wind turbine nacelle. The system comprises the ambient air channels arranged on the skin of the nacelle; at least a nacelle air channel on the skin of the nacelle for circulating nacelle air from an inlet port located inside the wind turbine nacelle to an outlet port located inside the wind turbine nacelle; and heat exchanging zones formed by the ambient air channels and nacelle air channels being configured so that at least a nacelle air channel is adjacent to at least an ambient air channel for cooling the nacelle air with the ambient air. The heat exchanging zones are located in the base and in the lateral sides of the nacelle. The nacelle skin comprises two entry channels for the ambient air received in the inlet area located above the heat exchanging zones of the lateral sides of the nacelle, a front cover configured to redirect the ambient air flow from the two entry channels toward the ambient air channels in the heat exchanging zones and a back cover configured with three outlet zones for the ambient air in front of said heat exchanging zones, being prevented the communication of the two entry channels with the outlet zones by cooperating plates protruding from the base of the two entry channels in the rear part of the nacelle with the back cover forcing the ambient air to pass through the ambient air channels before exiting through the outer zones of the back cover.

Other desirable features and advantages of said thermal conditioning system will become apparent from the subsequent detailed description of the invention and the appended claims, in relation with the enclosed drawings.

DETAILED DESCRIPTION OF THE INVENTION

Figure 1:
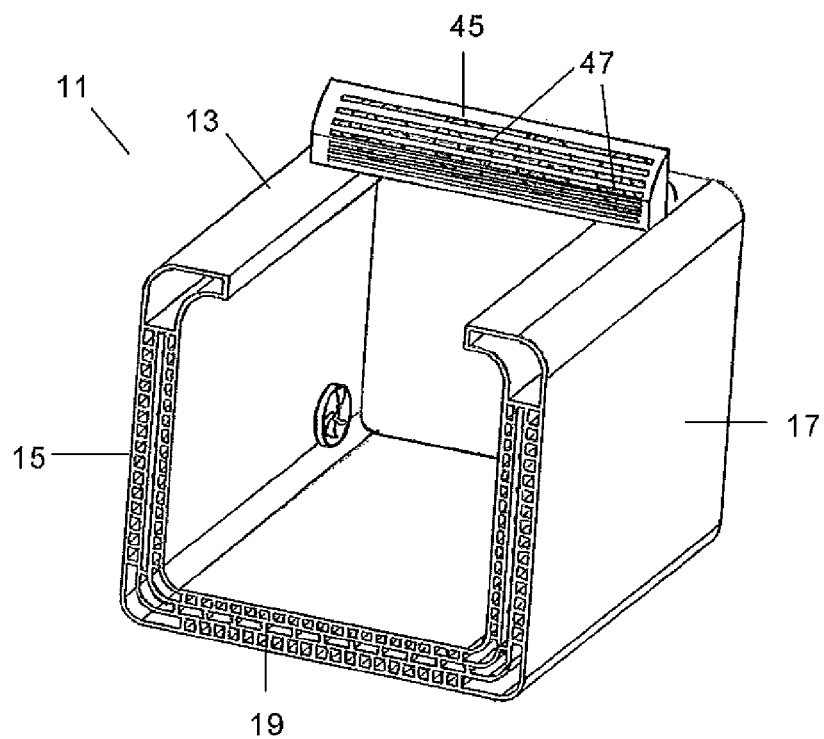
FIG. 1 is a schematic perspective view of a section of an off-shore wind turbine nacelle incorporating a thermal conditioning system according to one embodiment of the present invention.
Figure 2:
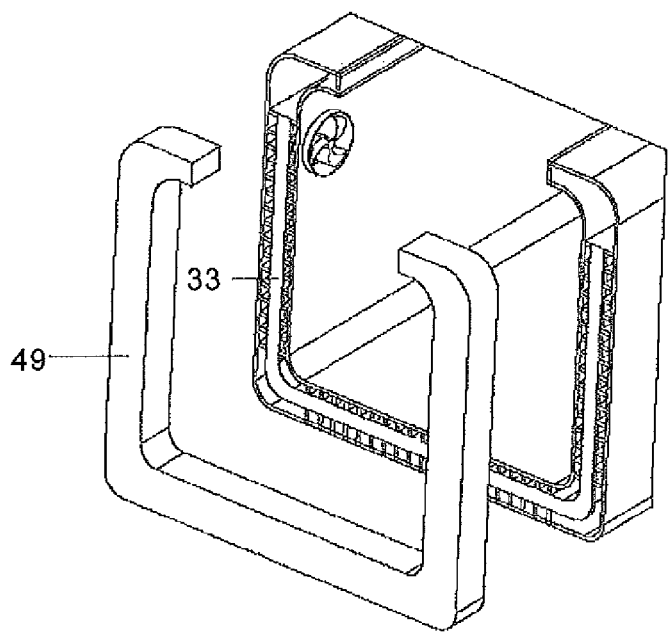
FIG. 2 is a schematic perspective view of the front part of an off-shore wind turbine nacelle incorporating a thermal conditioning system according to one embodiment of the present invention.
Figure 3:
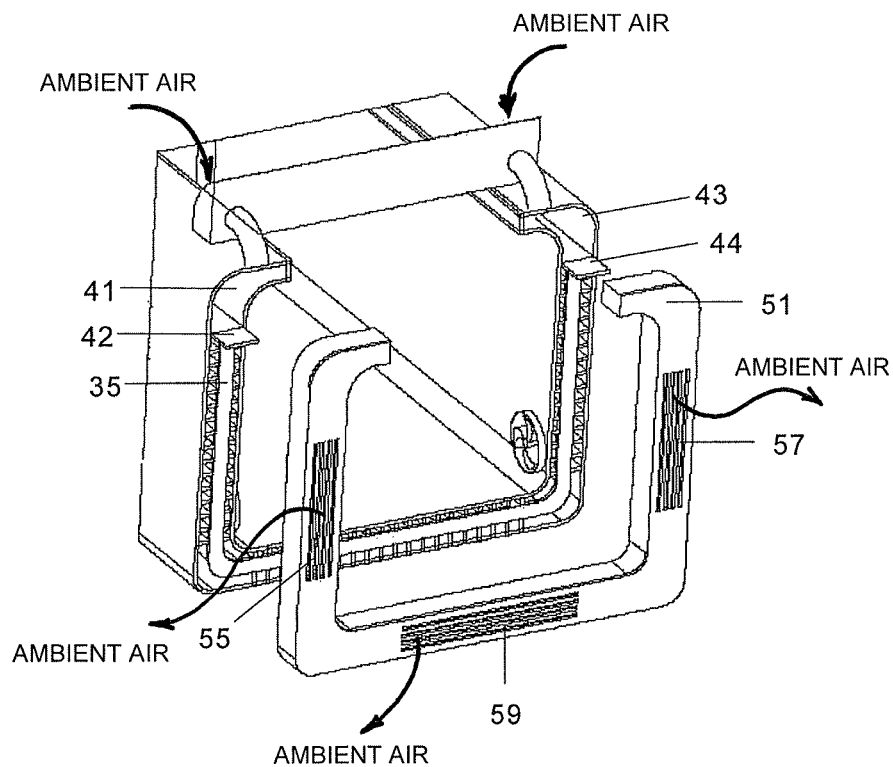
FIG. 3 is a schematic perspective view of the rear part of an off-shore wind turbine nacelle incorporating a thermal conditioning system according to one embodiment of the present invention.
Figure 4:
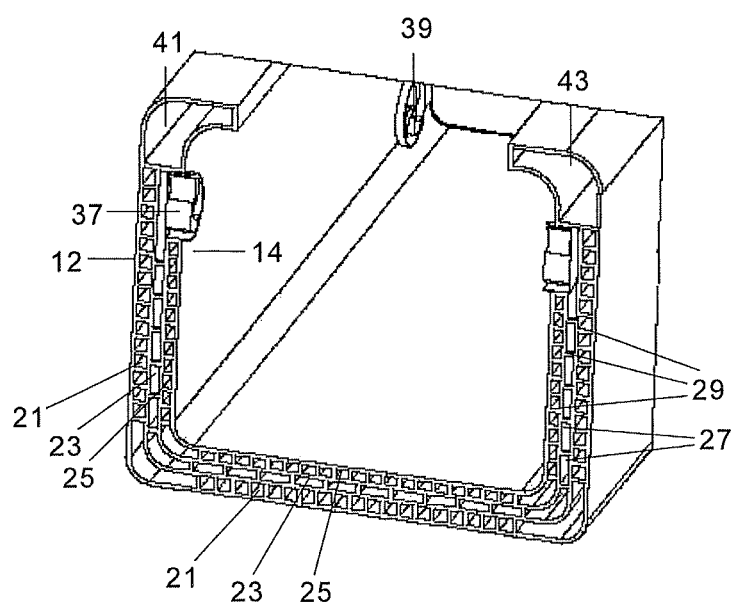
FIG. 4 is a schematic partial perspective view of a section of an off-shore wind turbine nacelle incorporating a thermal conditioning system according to one embodiment of the present invention illustrating the structure of the heat exchanging zones.

FIGS. 1-4 show the nacelle 11 of a wind turbine with a thermal conditioning system according to one embodiment of the present invention. The wind turbine components housed in the nacelle (main shaft, gearbox, generator, transformer) are not shown.

The thermal conditioning system comprises heat exchanging zones 15, 17, 19 in the lateral sides and in the base of the skin 13 of the nacelle 11 for transferring heat from a stream of nacelle air circulating by a channel 23 to a stream of ambient air circulating by two adjacent channels 21, 25.

These heat exchanging zones 15, 17, 19 are implemented between the outer wall 12 and the inner wall 14 of the nacelle skin 13 by means of a metallic structure formed by separating plates 27 between the nacelle air channel 23 and the ambient air channels 21, 25 and fins 29 delimiting multiple passages in said channels 21, 23, 25 for increasing the surface of the metallic structure in contact with the ambient air and with the nacelle air and therefore its heat exchange capacity.

It is considered that the heat exchanging zones 15, 17, 19 may cover a surface comprised between the 50-80% of the total surface of the base and the lateral sides of the nacelle 11.

The metallic structure shall be made up of corrosion resistant materials, for example, stainless steel with nickel chromium coating.

The inner and outer walls 12, 14 of the nacelle skin 13 can be made up of a composite material, for example, Glass Fiber Reinforced Plastic.

The nacelle air channels 23 of said heat exchanging zones 15, 17, 19 are closed by its front end 33 and by its rear end 35. They have an inlet port 37 provided with a fan to create a suction to draw air from the nacelle and an outlet port 39 also provided with a fan to improve the circulation of the air through the channel 23. Then the input to each heat exchanging zones 15, 17, 19 is hot air from the nacelle and the output is cooled air returned to the nacelle.

The ambient air reaches the heat exchanging zones 15, 17, 19 by the entry channels 41, 43 connected with the inlet area 45 provided with fans 47 located in the rear part of the nacelle and is routed to the ambient air channels 21, 25 of the heat exchanging zones 15, 17, 19 by a front part 49 of the nacelle 11 duly configured for it. Then, the ambient air circulates by the heat exchanging zones 15, 17, 19 and exit by an outlet area formed by three outlet zones 55, 57, 59 with openings adjacent to the ends of the ambient air channels 21, 25 of said heat exchanging zones 15, 17, 19 in a back part 51 of the nacelle 11. The plates 42, 44 protruding from the rear part of the base of the entry channels 41, 43 prevent, cooperating with the back part 51 of the nacelle, that the ambient air can reach directly the outlet zones 55, 57, 59.

Therefore, the ambient air does not come in contact with the wind turbine components inside the nacelle.

A thermal conditioning system according to this embodiment involves a new design of wind turbine nacelles for off-shore wind turbines. The available molding technologies allows its manufacturing with affordable cost.

Figure 5:
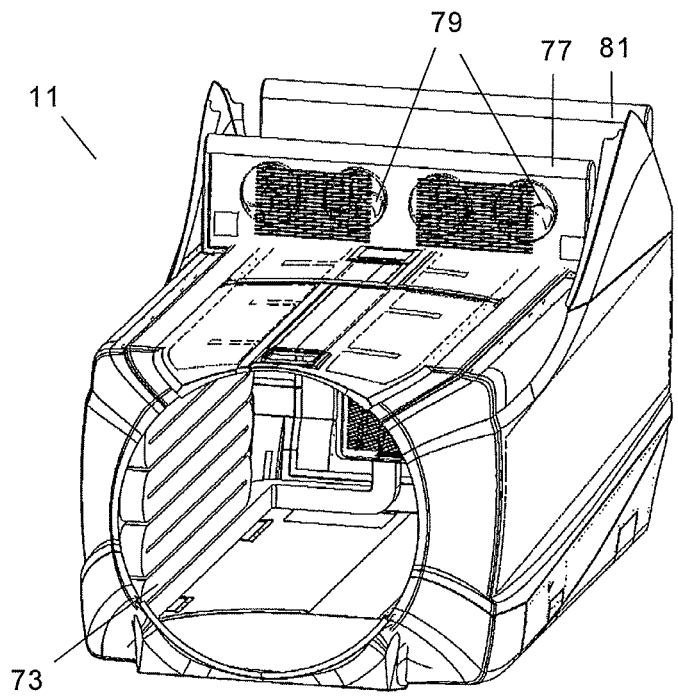
FIG. 5 is a schematic perspective view of an off-shore wind turbine having a thermal conditioning system according to another embodiment of the present invention.

FIG. 5 show the nacelle 11 of a wind turbine with a thermal conditioning system according to another embodiment of the present invention. The wind turbine components housed in the nacelle (main shaft, gearbox, generator, transformer) are not shown with the exception of one heat exchanger device 71.

Figure 6:
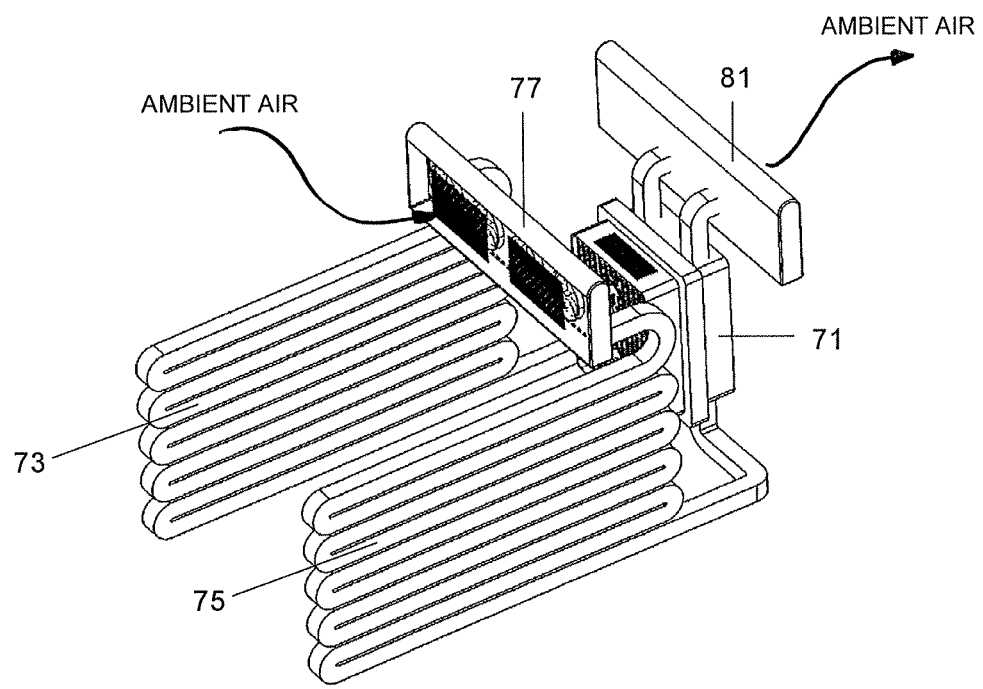
FIG. 6 is a schematic perspective view of the thermal conditioning system of the off-shore wind turbine of FIG. 5.
Figure 7:
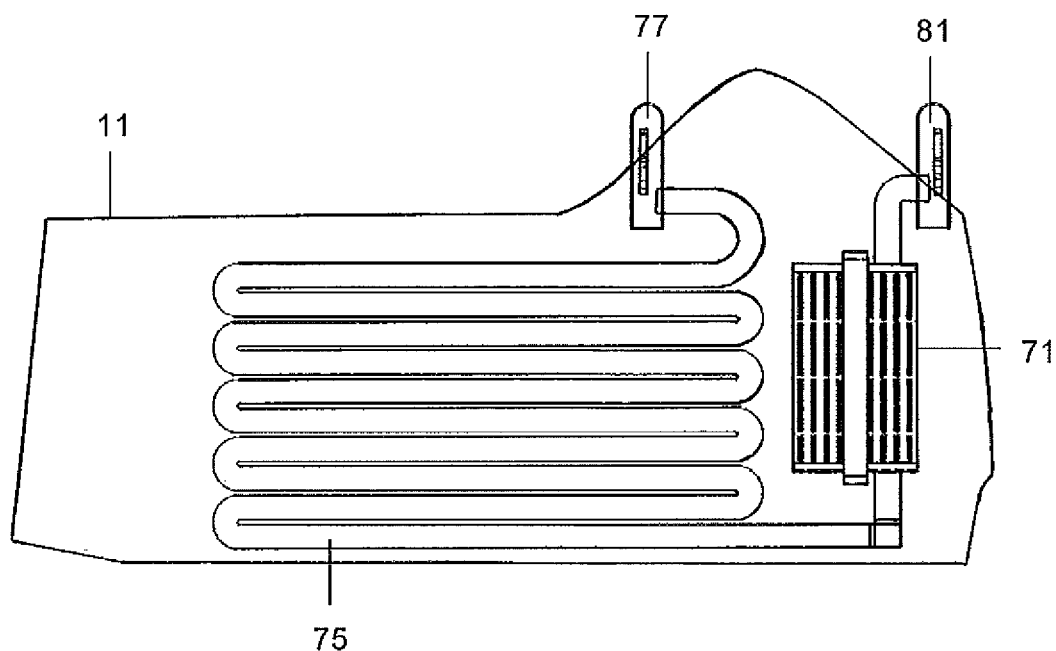
FIG. 7 is a side view of said thermal conditioning system and FIG. 8 is a schematic side view of the coupling of said thermal conditioning system with an internal heat exchanger.

As shown in FIGS. 5-7 the thermal conditioning system comprises two serpentine-shaped tubes 73, 75 arranged close to the lateral sides of the nacelle that are connected with an ambient air inlet area 77 provided with fans 79 which is located in the rear part of the nacelle 11 and with an ambient air outlet area 81 provided with fans (not shown) which is also located in the rear part of the nacelle.

The ambient air circulating by the serpentine-shaped tubes 73, 75 thanks to the fans installed in the ambient air inlet and outlet areas 77, 81 cools by convection the air inside the nacelle 11 and therefore the diameter and length of the serpentine-shaped tubes 73, 75 are determined for providing a predetermined convection capacity. The ambient air does not come in contact with the wind turbine components inside the nacelle.

As shown in FIGS. 6-7 the serpentine-shaped tubes 73, 75 can be conductively coupled to an internal heat exchanger device 71 to improve its heat exchanging capacity. Therefore existing heat exchangers in the wind turbine can be thermally connected to said tubes 73, 75 for optimizing the heat exchange inside the wind turbine nacelle.

Figure 8:
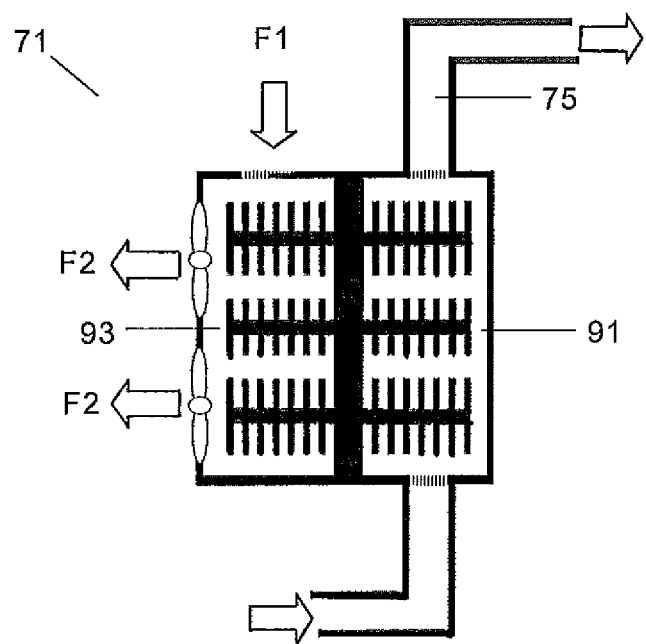

Said connection shall be made, as shown in FIG. 8, in a heat exchanging device having a side 93 for the nacelle air, with an entry indicated by arrow F1 and exits indicated by arrows F2 and a separate side 91 for the ambient air coupled to the tube 75 so that the ambient air is not mixed with the nacelle air.

A thermal conditioning system according to this embodiment can be easily implemented in known designs of off-shore wind turbine because does not require design modification to the existing nacelle housing.

The cost of this thermal conditioning system is low so that its addition to an off-shore wind turbine does not involve a significant cost increment.

The present invention provides therefore a thermal conditioning system for off-shore wind turbines that:

Eliminates the need of using big size, heavy weight and high cost heat exchangers.

Avoids the need of increasing the size of the nacelle and the installation of components outside the nacelle.

Uses the natural air velocities available outside the nacelle for cooling the wind turbine components.

Although the present invention has been described in connection with various embodiments, it will be appreciated from the specification that various combinations of elements, variations or improvements therein may be made, and are within the scope of the invention.

The invention claimed is:

1. A thermal conditioning system for an off-shore wind turbine comprising
- a nacelle air channel and at least one ambient air channel located between an outer wall and an inner wall of the nacelle, wherein the at least one ambient air channel has an inlet area and an outlet area both located outside the wind turbine nacelle preventing ambient air from entering in fluid communication with the air inside the wind turbine nacelle,
- an inlet port located inside the wind turbine nacelle and an outlet port located inside the wind turbine nacelle for circulating nacelle air in the nacelle air channel,
- heat exchanging zones formed by the nacelle air channel and the at least one ambient air channel being adjacent to one another
- at least one entry channel for the ambient air received in said inlet area,
- a front cover configured to redirect the ambient air from the at least one entry channel to the at least one ambient air channel,
- a back cover having at least one outlet zone for allowing the ambient air to exit the at least one ambient air channel once it has passed through said heat exchanging zones, and
- plates protruding from the base of a rear part of the nacelle that cooperate with the back cover to deflect the ambient air to pass through the at least one ambient air channel before exiting through the at least one outlet zone of the back cover,
- said heat exchanging zones being arranged to cool conductively or convectively the air inside the wind turbine nacelle.

2. The thermal conditioning system of claim 1, wherein said heat exchanging zones are implemented by means of a metallic structure placed between the outer wall and the inner wall of the nacelle,
wherein the metallic structure comprises plates for separating the nacelle air channel from the at least one ambient air channel and fins for delimiting multiple passages in each channel.

3. The thermal conditioning system of claim 2, wherein said metallic structure is made up of a corrosion resistant material.

4. The thermal conditioning system of claim 3, wherein said metallic structure is made up of stainless steel with nickel chromium coating.

5. The thermal conditioning system of claim 1, further comprising one or more fans in the inlet area of the at least one ambient air channel.

6. The thermal conditioning system of claim 1, further comprising at least one fan on the inlet and outlet ports of the nacelle air channel.

7. The thermal conditioning system of claim 1, wherein said heat exchanging zones are configured with the nacelle air channel between two ambient air channels.

8. The thermal conditioning system of claim 1, wherein said heat exchanging zones cover a surface comprised between 50-80% of the total surface of the base and lateral sides of the nacelle.

9. The thermal conditioning system of claim 1, wherein the at least one ambient air channels is arranged inside the wind turbine nacelle close to its inner periphery.

10. The thermal conditioning system of claim 1, wherein the inlet and outlet areas of the at least one ambient air channel are located on the roof of the nacelle and are provided with fans.

* * * * *